Dec. 23, 1958     W. A. SMART, JR., ET AL     2,865,501
SUTURE TUBE SHIPPING PACKAGE
Filed Nov. 29, 1957
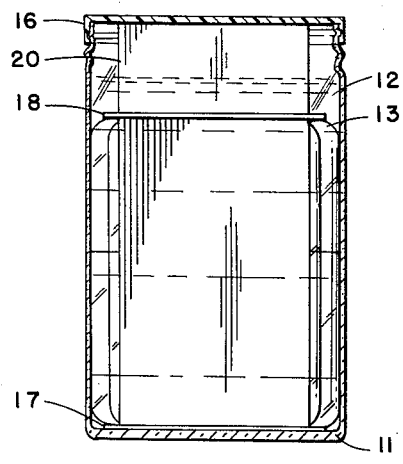
FIG. 1
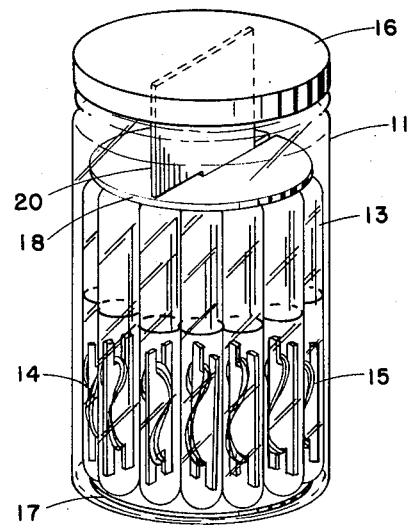
FIG. 2
FIG. 3
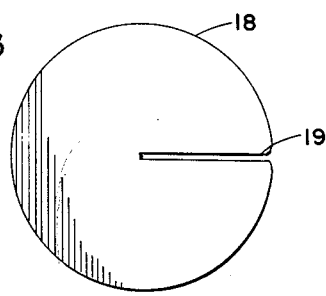
FIG. 4
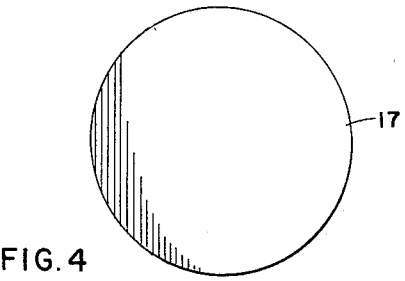
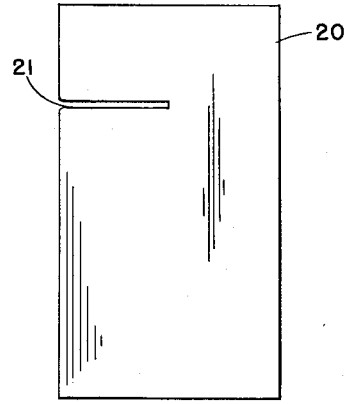
FIG. 5
INVENTOR.
WILLIAM A. SMART, JR.
THOMAS J. CONNOLLY
BY
*Samuel Branch Walker*
ATTORNEY United States Patent Office 2,865,501
Patented Dec. 23, 1958

2,865,501

SUTURE TUBE SHIPPING PACKAGE

William A. Smart, Jr., Brookfield, and Thomas J. Connolly, Danbury, Conn., assignors to American Cyanamid Company, New York, N. Y., a corporation of Maine Application November 29, 1957, Serial No. 699,631

2 Claims. (Cl. 206—63.3)

This invention relates to a shipping package for glass suture tubes; and more particularly to a package in which a plurality of sealed glass suture tubes in parallel configuration are retained in position by a suture retainer to keep the tubes immersed and particularly to prevent breakage of the tubes in transit.

Sutures for use in the medical profession are at present usually shipped in sealed glass tubes containing a sterile tubing fluid which conditions the sutures ready for use with one or more sutures in each tube. The sutures may be needled or without needles and for present purposes ligatures are classed with sutures and included in the scope of the invention.

The suture tubes are packed in parallel configuration in containers which may be either metal cans or glass jars and which tubes are immersed in a jar fluid to keep the outside sterile. Frequently screw top glass jars are used.

The glass suture tubes even though immersed in a liquid and cushioned by the liquid are free to slide in the outer container. A certain amount of free space is required to allow for expansion with temperature changes; and as the glass tubes slide or are bounced in shipment, the glass tubes may be broken. Even though the outer container is packed in corrugated cardboard boxes and otherwise cushioned, the glass suture tubes are still subject to breakage.

We have found that the tubes may be protected against breakage and shipped by commercial carrier with a minimum of tube breakage by using a retainer and cushion to protect the tubes. The accompanying drawings show an embodiment of our invention:

Figure 1 shows a sectional view of a completed package.
Figure 2 is a pictorial view of the complete package.
Figure 3 is a face view of the suture tube retainer.
Figure 4 is a face view of the cushion disc.
Figure 5 is a face view of the slotted divider.

As shown in the drawings, a glass jar 11 contains a jar fluid 12 in which are immersed suture tubes 13. These suture tubes are sealed glass tubes partially filled with a tubing fluid 14 in which is immersed one or more sutures 15. The sutures may or may not have needles. The jar fluid and the tubing fluid may be of conventional composition. The glass jar is closed with a jar top 16.

Between the bottom of the glass jar and the lower end of the suture tubes is placed a cushion disc 17 which is of a resilient material, conveniently vulcanized fiber-board. Above the tubes is a suture tube retainer 18 which may also be of vulcanized fiber-board. This retainer is large enough to contact the end of all of the tubes and engage them against shifting. The suture tube retainer must be small enough to pass through the opening in the top of the glass jar but may be partially bent during insertion and removal. The suture tube retainer has a slot 19 therein. This slot runs approximately half way into the retainer. A vertical slotted divider 20 is inserted vertically parallel with the tubes. The slotted divider has a slot 21 therein. The slot in the divider engages the tube retainer and the slot in the tube retainer engages the slotted divider. These slots are preferably just big enough to hold the cooperating member. The slotted divider extends from the tube retainer up to and bears against the jar top and is held against moving longitudinally by contact with the jar top. The portion of the divider which extends in between the tubes is long enough to be held against twisting by the tubes and preferably is long enough to extend towards or touch the cushion disc. The slotted divider aids in preventing the suture tubes from twisting and acts as a cushion to keep them from moving about and similarly the tubes aid in positioning the slotted divider. The slotted divider may have a width of from about half or less of the jar diameter to as great a width as may be inserted in the opening in the jar. As the vertical divider is approximately centered, the normal helical twisting of the glass tubes in the jar is prevented because the twist on one side would oppose the twist on the other. The tubes can only move back and forth in a direction parallel to the divider and because the divider engages the retainer, the divider is positioned against movement.

When the suture jar is opened for use the slotted divider and the cooperating suture retainer may be conveniently removed as a unit leaving the suture tubes in vertical configuration and ready to be individually selected for final use. For a jar with an external diameter of 3 5/8 inches and a neck opening of 3 1/16 inches, the cushion disc may have a diameter of about 3 inches and be of 0.010 inch fiber-board. The suture tube retainer is of approximately the same diameter and is of 0.020 inch fiber-board. The slotted divider is of 0.030 inch fiber-board approximately 2 inches in width and of such length as to extend from the cushion disc to the jar top, with a slight allowance for manufacturing tolerances. The slot in the slotted divider is just wide enough to hold the suture tube retainer and the slot in the suture tube retainer is just wide enough to hold the slotted divider. Either or both slots are conveniently slightly wider at the open side to speed assembly. The slot in the divider is at such height as to position the suture tube retainer above the glass suture tubes. Because of manufacturing variations in jar sizes and height and length of glass suture tubes, a reasonable manufacturing tolerance is required. Even an allowance as great as a quarter of an inch gives excellent protection to the glass suture tubes.

Obviously the exact dimensions and thickness of the disc, retainer, and divider may vary and other resilient stiff materials may be used for these elements. The materials of construction should be resistant to the jar fluid, easily formed, and economical. Fiber-board and many plastics such as polyethylene, the super polyamide plastics, and other plastic material meet these requirements.

The use of the retainer, disc, and divider reduced breakage under otherwise identical test conditions from 20% to 0.1%. The reduction in breakage also permits using a deeper breaking groove, so that the tubes may be more easily opened.

We claim:

1. A shipping package of glass suture tubes, said package comprising in combination: a plurality of sealed glass suture tubes in substantially parallel configuration in an outer container, at least one suture in each tube, a sterilizing liquid surrounding and covering the suture tubes and substantially filling the container, a cushion disc between the bottom of the container and the glass suture tubes, a stiff suture tube retainer above the top of the glass suture tubes and of sufficient size to engage all suture tubes in the container, said retainer having a slot therein, and a slotted divider, the slot in said divider engaging said retainer and the slot in said retainer engaging said divider, said divider being of sufficient length above the slot to bear against the top of the container and of sufficient length below the slot to engage, cushion and orient the suture tubes, and be oriented by said suture tubes.

2. A shipping package of glass suture tubes, said package comprising in combination: a plurality of sealed glass suture tubes in substantially parallel configuration in a glass jar, at least one suture in each tube, a sterilizing liquid surrounding and covering the suture tubes and substantially filling the jar, a cushion disc between the bottom of the jar and the glass suture tubes, a stiff suture tube retainer above the top of the glass suture tube and of sufficient size to engage all suture tubes in the jar, said retainer having a slot therein, and a slotted divider, the slot in said divider engaging said retainer and the slot in said retainer engaging said divider, said divider being of sufficient length above the slot to bear against the top of the jar and of sufficient length below the slot to engage, cushion and orient the suture tubes, and be oriented by said suture tubes.

References Cited in the file of this patent

UNITED STATES PATENTS

| | | |
|---|---|---|
| 170,172 | Hunt | Nov. 23, 1875 |
| 2,682,857 | Reissmann et al. | July 6, 1954 |